United States Patent
Chun et al.

(10) Patent No.: US 8,205,021 B2
(45) Date of Patent: Jun. 19, 2012

(54) MEMORY SYSTEM AND INTEGRATED MANAGEMENT METHOD FOR PLURALITY OF DMA CHANNELS

(75) Inventors: Ik Jae Chun, Daejeon (KR); Chun Gi Lyuh, Daejeon (KR); Se Wan Heo, Daejeon (KR); Sang Hun Yoon, Daejeon (KR); Tae Moon Roh, Daejeon (KR); Jong Kee Kwon, Daejeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/882,141

(22) Filed: Sep. 14, 2010

(65) Prior Publication Data

US 2011/0153878 A1 Jun. 23, 2011

(30) Foreign Application Priority Data

Dec. 21, 2009 (KR) .......................... 10-2009-0128401
Mar. 30, 2010 (KR) .......................... 10-2010-0028448

(51) Int. Cl.
*G06F 13/28* (2006.01)

(52) U.S. Cl. ............................................ 710/22; 710/27

(58) Field of Classification Search .................. 710/22, 710/27
See application file for complete search history.

(56) References Cited

U.S. PATENT DOCUMENTS

2009/0125648 A1 5/2009 Huang et al.
2010/0017544 A1* 1/2010 Chun et al. ................... 710/22

FOREIGN PATENT DOCUMENTS

| JP | 2000-298642 A | 10/2000 |
| KR | 10-2006-0127400 A | 12/2006 |
| KR | 10-2009-0054793 A | 6/2009 |

OTHER PUBLICATIONS

"PrimeCell® DMA Controller (PL080)", Technical Reference Manual, 2003-2005, Revision: r1p3, ARM Limited.

* cited by examiner

Primary Examiner — Chun-Kuan Lee
Assistant Examiner — David Martinez

(57) ABSTRACT

Provided are a memory system and an integrated management method for a plurality of direct memory access (DMA) channels. The memory system includes a memory controller exchanging data with a memory and having a plurality of channels physically separated from each other, and a DMA controller having a plurality of DMA channels physically separated from each other and in contact with the plurality of channels of the memory controller, and exchanging data with the memory via the plurality of DMA channels and the memory controller.

6 Claims, 6 Drawing Sheets

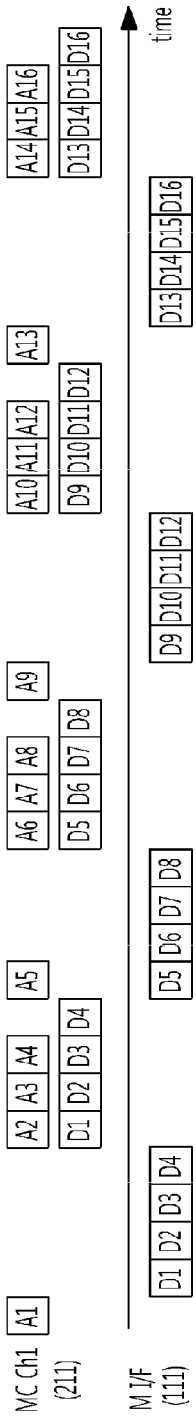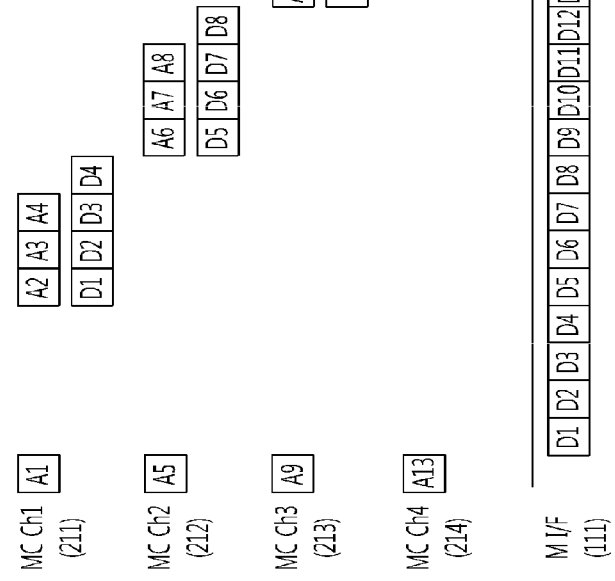
FIG. 5A
FIG. 5B

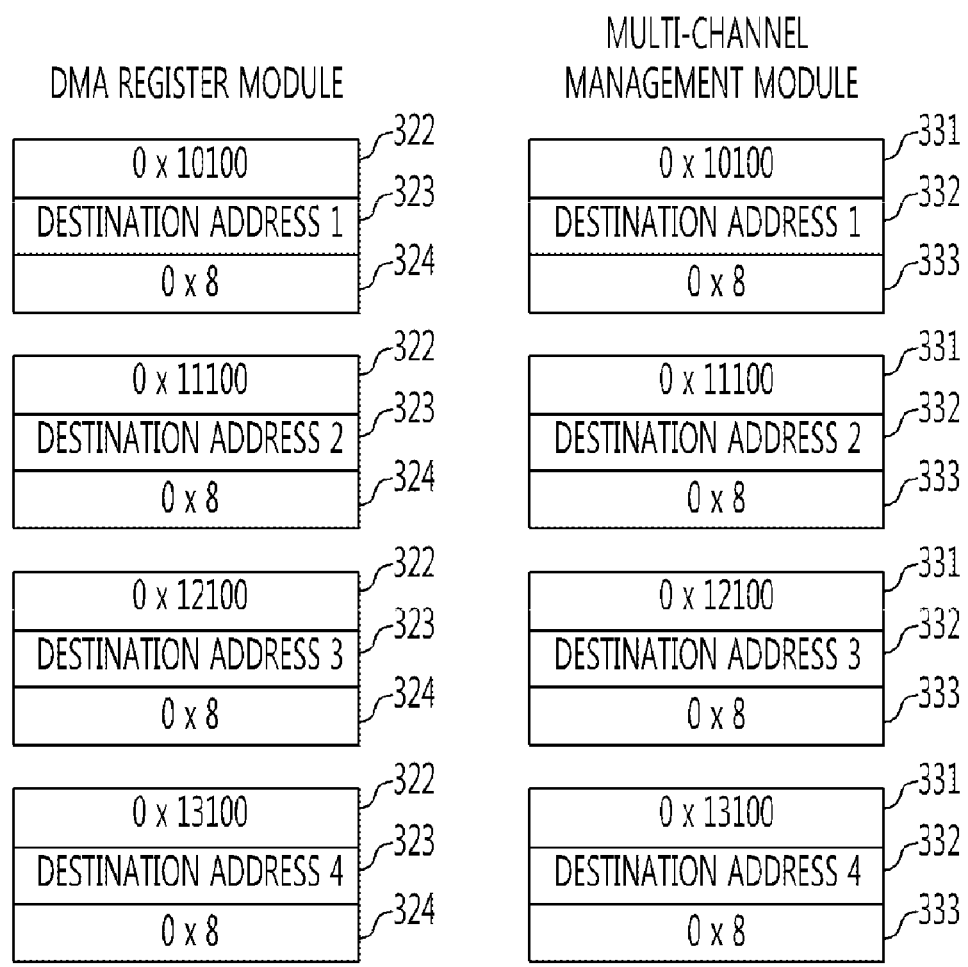

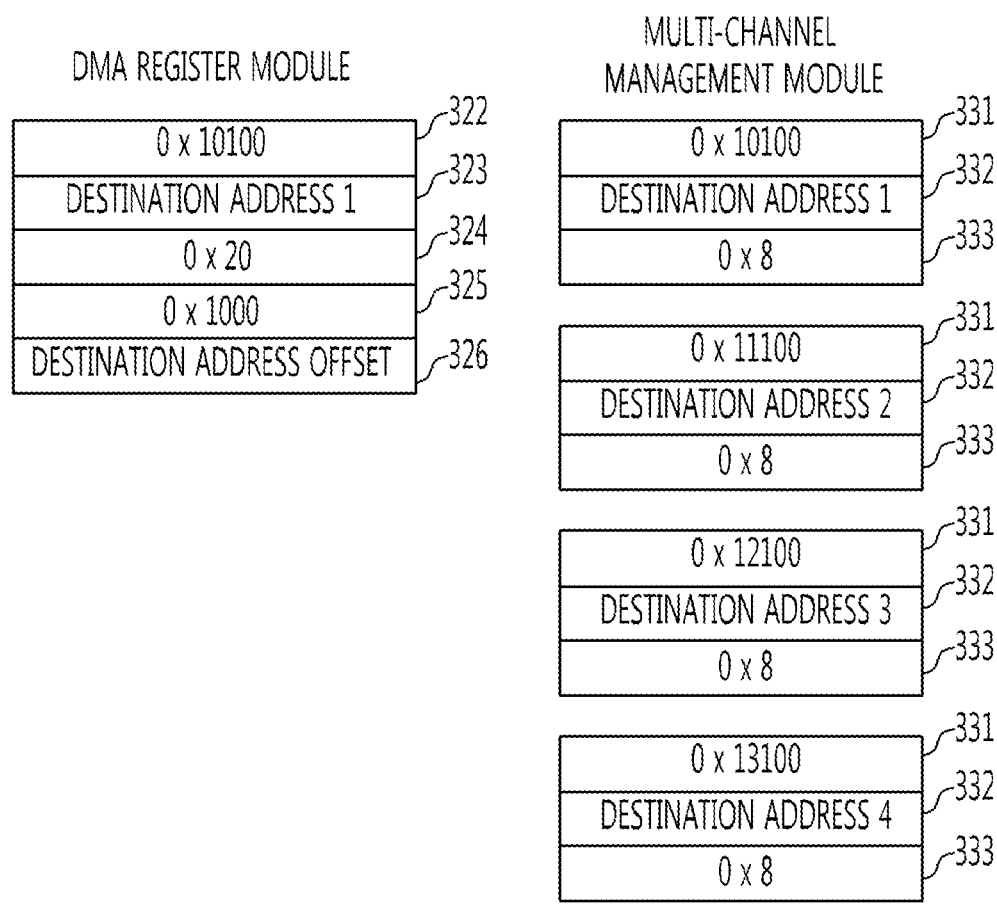

MEMORY SYSTEM AND INTEGRATED MANAGEMENT METHOD FOR PLURALITY OF DMA CHANNELS

CROSS-REFERENCE TO RELATED APPLICATION

This application claims priority to and the benefit of Korean Patent Application No. 10-2009-0128401, filed Dec. 21, 2009, and Korean Patent Application No. 10-2010-0028448, filed Mar. 30, 2010, the disclosure of which is incorporated herein by reference in its entirety.

BACKGROUND

1. Field of the Invention

The present invention relates to a memory system having a plurality of direct memory access (DMA) channels and an integrated management method for the plurality of DMA channels. More particularly, the present invention relates to a memory system which has a plurality of DMA channels and allows access to a memory through a plurality of channels to maximize data transmission efficiency by integratedly controlling the corresponding channels, and an integrated management method for the plurality of DMA channels.

The present invention was supported by the IT R&D program of MKE. [2008-S-006-04, Component Module for Ubiquitous Terminal].

2. Discussion of Related Art

General memory controllers array data toward a system memory or data from the system memory as fast as a memory device allows. Since the memory controller can process data as fast as the memory device allows, this does not limit a bandwidth. Meanwhile, one method of increasing a bandwidth is to increase a rate of a memory data bus connecting the memory controller to the memory devices. However, the memory devices cannot catch up with increases in data bandwidth of the memory controller and the memory data buses.

Meanwhile, specific memory controllers have a plurality of channels to raise memory accessibility of a plurality of processors or peripheral devices. However, although the memory controllers have the plurality of channels, they cannot increase bandwidths. These controllers only provide an advantage of allocating the entire data transmission bandwidth that can be provided by the memory to a device of the destination via the plurality of channels. In other words, the memory controller having the plurality of channels can provide several channels but cannot increase a memory bandwidth because it actually allows a single memory access. However, due to the plurality of channels, the memory controller can previously access a spare channel to prepare a memory access operation, and equally divide the bandwidth when the plurality of channels have equal priorities to access the memory.

In the memory controllers having the plurality of channels, like a memory controller having one channel, a free-charging time is essential for next data transmission after data is transmitted using one channel. However, when data is simultaneously transmitted using the plurality of channels provided by the memory controller, the memory controller can previously prepare next data transmission, and thus transmission performance of a memory can be enhanced. For example, a dynamic random access memory (DRAM) needs a plurality of clock periods to activate a row and free-charge a memory bank. Thus, a waiting time corresponding to the plurality of clock periods is needed. Depending on the length of a burst to be read or written, the waiting time may correspond to more clock periods than those used for pure data transmission. However, when next data transmission is prepared during the reading or writing burst, the waiting time of the memory is included in the pure data transmission time, and data transmission efficiency can be enhanced. Such an effect may be obtained by the memory controller having the plurality of channels.

Accordingly, a DMA channel controller and an integrated channel management method for effectively using a multi-channel memory controller are required to obtain such an effect.

SUMMARY OF THE INVENTION

The present invention is directed to integratedly managing a plurality of direct memory access (DMA) channels in contact with a multi-channel memory controller to enhance data transmission performance of the memory controller.

The present invention is also directed to allowing a multi-channel memory controller to perform data transmission via a plurality of channels through integrated management of a plurality of DMA channels to maximize data transmission performance.

One aspect of the present invention provides a memory system, including: a memory controller exchanging data with a memory and having a plurality of channels physically separated from each other; and a DMA controller having a plurality of DMA channels physically separated from each other and in contact with the plurality of channels of the memory controller, and exchanging data with the memory via the plurality of DMA channels and the memory controller.

The memory system may further include a contact module connecting the channels of the memory controller with the DMA channels.

The contact module may include a plurality of buses or a matrix switch for connecting the channels of the memory controller with the DMA channels.

The DMA controller may include: a register module having a set of registers storing information on the exchanged data; and a multi-channel management module dividing and setting set values for the plurality of DMA channels with reference to the set of registers.

The set of registers may include at least one selected from the group consisting of a source address, a destination address, a transmission size, a source address offset and a destination address offset, and the multi-channel management module may set values of source and destination addresses for the plurality of DMA channels by selectively adding or subtracting the values of the source and destination address offsets to or from the values of the source and destination addresses.

The multi-channel management module may set a value of a transmission size for the respective DMA channels by dividing the value of the transmission size by the number of the DMA channels.

The memory controller may exchange data with the memory via a memory interface.

The DMA controller may further include one port for exchanging data with a peripheral device.

Another aspect of the present invention provides an integrated management method for a plurality of DMA channels, including dividing at least one value selected from the group consisting of a predetermined source address, a destination address, a transmission size and a source address set related to exchanged data, and setting set values for the plurality of DMA channels.

The dividing at least one value and setting set values may include setting values of source and destination addresses for the plurality of DMA channels by selectively adding or subtracting the values of the source and destination address offsets to or from the values of the source and destination addresses.

The dividing at least one value and setting set values may include setting a value of a transmission size for the respective DMA channels by dividing the value of the transmission size by the number of the DMA channels.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIGS. 5A and 5B illustrate address and data transmission characteristics when only one channel is used to read data, and when four channels are used to read data, respectively; and FIGS. 6A and 6B illustrate examples of operation setting values for DMA channels applied to register setting for transmitting data using one DMA channel and to integrated management of four DMA channels.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

Memory System

Figure 1:
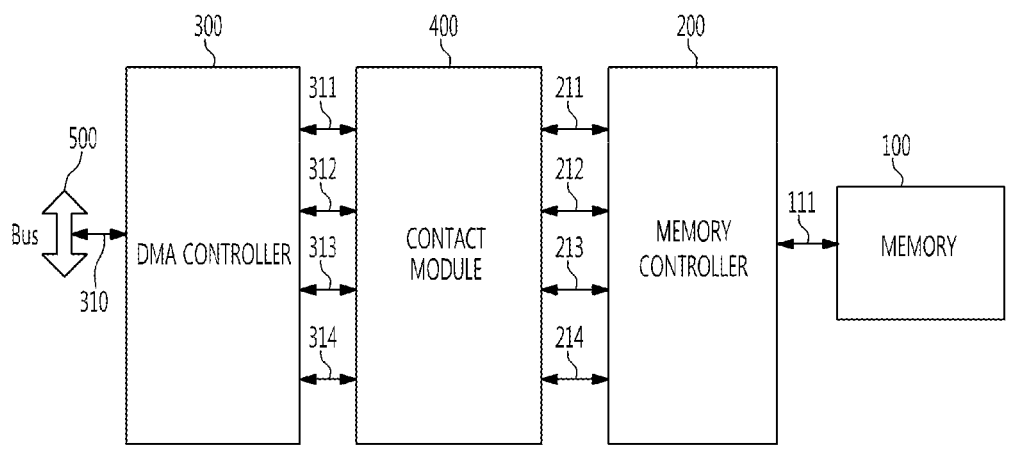
FIG. 1 is a block diagram of a configuration of a memory system according to an exemplary embodiment of the present invention.

FIG. 1 is a block diagram of a configuration of a memory system according to an exemplary embodiment of the present invention.

Referring to FIG. 1, the memory system according to an exemplary embodiment of the present invention may include a memory 100, a memory controller 200, a direct memory access (DMA) controller 300, and a contact module 400. The memory controller 200 is composed of a plurality of channels, and the DMA controller 300 may be simultaneously in contact with a plurality of channels. As shown in FIG. 1, the 4-channel memory controller 200 and the DMA controller 300 simultaneously in contact with four channels will be described as an example.

To begin with, the memory 100 may be a common memory device such as a dynamic random access memory (DRAM) or a synchronous dynamic random access memory (SDRAM).

The memory controller 200 has four channels 211, 212, 213 and 214 to control the one-channel memory 100, and the DMA controller 300 has DMA channels 311, 312, 313 and 314 physically separated from each other to be in contact with the memory controller 200 having the four channels 211, 212, 213 and 214.

Meanwhile, the memory 100 may be connected to the memory controller 200 via a memory interface 111, and the memory controller 200 and the DMA controller 300 may be connected via a contact module 400. In other words, the contact module 400 serves to bring the four channels 311, 312, 313 and 314 of the DMA controller 300 into simultaneous contact with the channels 211, 212, 213 and 214 of the memory controller 200 physically separated from each other. To this end, the contact module 400 may be composed of four separate buses or a matrix switch capable of simultaneously connecting at least four channels.

Figure 2:
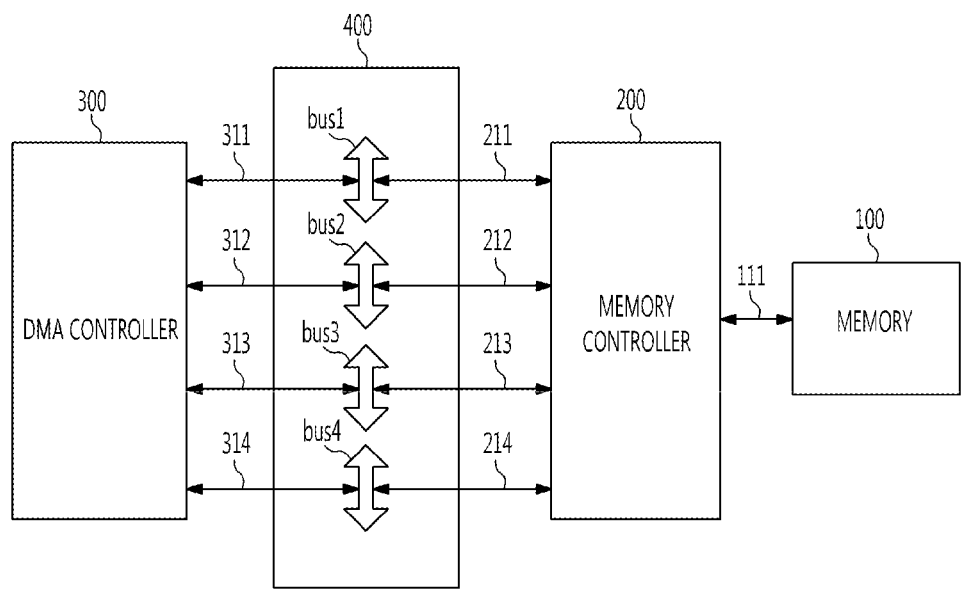
FIG. 2 is a block diagram of a configuration of the memory system in FIG. 1 in which a contact module is composed of a bus.
Figure 3:
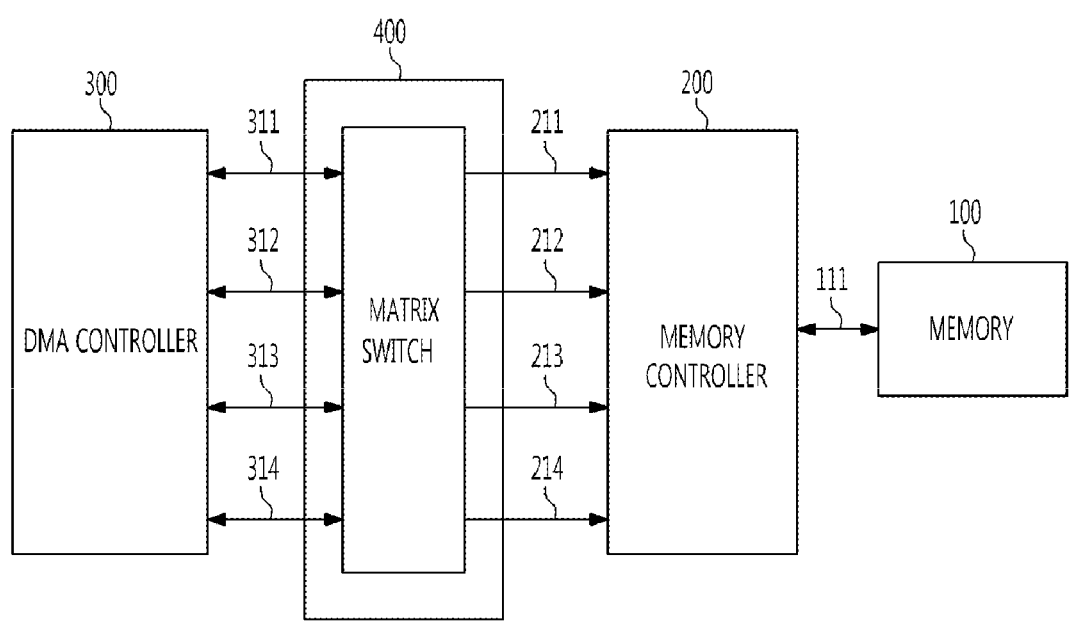
FIG. 3 is a block diagram of a configuration of the memory system in FIG. 1 in which the contact module is composed of a matrix switch.

FIG. 2 illustrates the memory system of FIG. 1 in which the contact module 400 is composed of four buses bus1, bus2, bus3 and bus4, which are separated from each other. FIG. 3 illustrates the memory system of FIG. 1 in which the contact module 400 is composed of a matrix switch.

However, FIGS. 2 and 3 merely illustrate examples of the contact module 400, and thus the contact module 400 can be implemented in any type of device, such as a contact logic structure, capable of connecting channels to each other.

The DMA controller 300 receiving data from the memory 100 and the memory controller 200 via such a contact module 400 transmits the data to a peripheral device and other internal devices through a separate DMA port. Here, the data may be transmitted by a bus 500, and so on.

An internal configuration of the DMA controller 300 which is considered a characteristic component of the present invention will be described below.

DMA Controller

Figure 4:
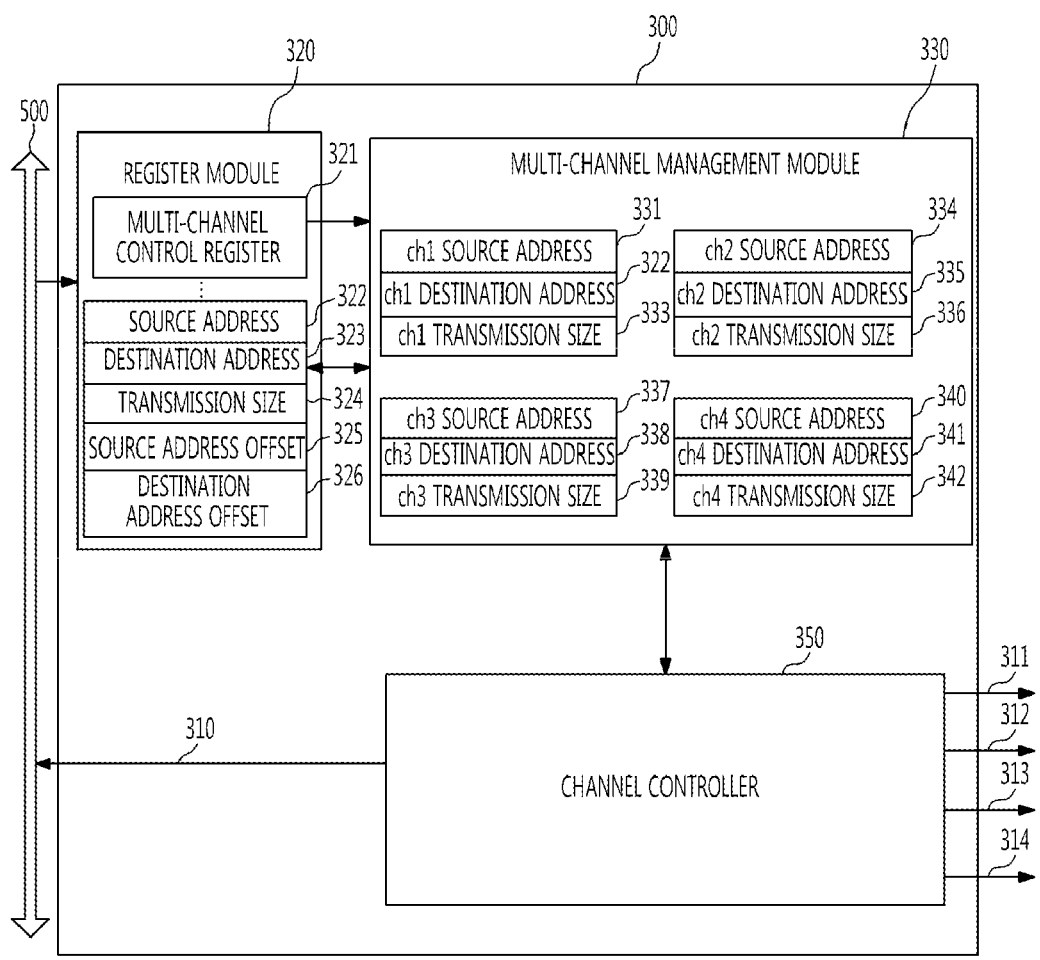
FIG. 4 is a block diagram of a configuration of a direct memory access (DMA) controller according to an exemplary embodiment of the present invention.

FIG. 4 is a block diagram of an internal configuration of the DMA controller 300 according to an exemplary embodiment of the present invention.

As shown in FIG. 4, the DMA controller 300 may include a register module 320, a multi-channel management module 330, and a DMA channel controller 350.

To begin with, the register module 320 may be formed in basically the same structure as a register of a general DMA controller, and include a set of specific registers. The register module 320 for data transmission may include a multi-channel control register 321, and further include the set of registers capable of storing information such as a source address 322, a destination address 323, a transmission size 324, a source address offset 325, and a destination address offset 326. Here, the set of registers controlling the channels may be plural in number, and thus can sequentially control the channels. The channels 311, 312, 313, and 314 of the DMA controller 300, which access the memory controller 200 via the contact module 400, may be independently controlled according to values of the registers used to control the respective channels, and managed to operate as one channel by the multi-channel management module 330 controlled by the multi-channel control register 321 of the register module 320. Meanwhile, the source address offset 325 and the destination address offset 326 are used for the multi-channel management module 330 to divide a set value for a transmission block into four values to be set, which will be described in detail below.

The multi-channel management module 330 serves to divide the set values for the entire block to be transmitted into four values using the values of the source address 322, the destination address 323, the transmission size 324, the source address offset 325, and the destination address offset 326, which are set in the set of registers controlling one channel, and set the divided values to the four DMA channels 311, 312, 313, and 314. In detail, the source address 322 set to the set of registers of the register module 320 may be divided into a source address 331, a source address 334, a source address 337, and a source address 340, and the divided source addresses 331, 334, 337 and 340 may be set to the channels 311, 312, 313 and 314, respectively. Likewise, the set values of the destination address 323 and the transmission size 324 may be divided into destination addresses 332, 335, 338 and 341 and transmission sizes 333, 336, 339 and 342, and the divided destination addresses 332, 335, 338 and 341 and the divided transmission sizes 333, 336, 339 and 342 may be set to the respective channels 311, 312, 313 and 314.

A detailed dividing and setting method is as follows. First, as the source and destination addresses 331 and 332 for the channel 311, the source and destination addresses 322 and 324 for the register module 320 may be used. The source and destination addresses 334 and 335 for the channel 312 may be set by adding the values of the source and destination address offsets 325 and 326 of the register module 320 to the source and destination addresses 331 and 332 of the preceding channel 311. The source and destination addresses 337 and 338 for the channel 313 may also be set by adding the values of the source and destination address offsets 325 and 326 of the register module 320 to the source and destination addresses 334 and 335 of the preceding channel 312. The source and destination addresses 340 and 341 for the channel 314 are set by the same method as described above. Meanwhile, values of the transmission sizes 333, 336, 339 and 342 for the respective channels 311, 312, 313 and 314 may be obtained by dividing the values of the transmission size 324 of the register module 320 by the number of the channels 311, 312, 313 and 314.

As a result, the four DMA channels 311, 312, 313 and 314 may share an operation which is performed by one channel. Further, the multi-channel management module 330 may transfer the reset values of the registers 331 to 342 to the DMA channel controller 350 to independently control the four channels 311, 312, 313 and 314. Thus, the four channels 311, 312, 313 and 314 can access the memory controller 200 via the contact module 400, thereby reading or writing data from or to the memory 100.

The data read from the memory 100 via the four DMA channels 311, 312, 313 and 314 is transmitted to peripheral devices or other devices through the one DMA port 310. Meanwhile, during general operation, data read from the peripheral devices or other devices is transmitted to the DMA controller 300 through the one DMA port 310. In this case, the multi-channel management module 330 may also divide the set value for the entire block to be transmitted into four values, and set the divided values to the four DMA channels 311, 312, 313 and 314, thereby allowing the four DMA channels 311, 312, 313 and 314 to be independently controlled. Accordingly, the data transferred through the DMA port 310 is distributed to the four channels 311, 312, 313 and 314 and transferred to the memory 100 via the memory controller 200, and the memory 100 stores the transmitted data.

Likewise, in the DMA controller 300, the multi-channel management module 330 may set the four channels 311, 312, 313 and 314 physically separated from each other to operate as one channel, and the DMA channel controller 350 controls the four channels 311, 312, 313 and 314 of the DMA controller 300 and the four channels 211, 212, 213 and 214 of the memory controller 200 to operate in relation to each other using the setting, thereby maximizing transmission efficiency of the memory.

Transmission Characteristic

FIGS. 5A and 5B illustrate address and data transmission characteristics in the channels 211, 212, 213 and 214 of the memory controller 200 and the memory interface 111 when one channel is used to read data, and when the four channels are used to read data according to an exemplary embodiment of the present invention.

Referring to FIG. 5A, when one channel is used to transmit addresses and data, there are periodic gaps as long as pre-charging time for next data transmission after predetermined data has been transmitted from the memory 100. In other words, when pieces of data D1, D2, D3 and D4 are transmitted from the memory 100 via the memory interface 111, it is essential to have free-charging time for transmitting next pieces of data D5, D6, D7 and D8. Thus, to transmit all the data, the sum of the transmission time for all the data and the free-charging time is taken.

On the other hand, referring to FIG. 5B, when four channels are used, and data transmission is performed in one channel, free-charging is performed in another channel. In other words, while data transmission is performed in the channel 211, free-charging can be performed in the channel 212. Thus, as soon as the data transmission in the channel 211 is completed, data transmission in the channel 212 is performed. As a result, the total data transmission time is reduced as much as a clock period necessary for free-charging, and thus the data transmission efficiency can be maximized.

Driving Examples for DMA Controller

FIGS. 6A and 6B illustrate examples of operation setting values for the DMA channels applied to register setting for data transmission using one DMA channel and to integrated management of four channels by the multi-channel management module 330.

Referring to FIG. 6A, when only one DMA channel is used, it can be seen that the DMA controller should sequentially set register values for a channel operation four times. In other words, the DMA register module should set different register values four times.

On the other hand, referring to FIG. 6B, the register module 320 sets channel values once so that the four channels can be simultaneously managed by the multi-channel management module 330 according to an exemplary embodiment of the present invention. In detail, when the values of the source address 322, the destination address 323, the transmission size 324, the source address offset 325, and the destination address offset 326 are set by the register module 320, the multi-channel management module 330 sets values for the four channels using these values only. As described above, the source address 331 and the destination address 332 for the channel 311 may be set to the source and destination addresses 322 and 323, and the source and destination addresses 334 and 335 for the channel 312 may be set by adding the values of the source and destination address offsets 325 and 326 to the source and destination addresses 331 and 332. Register values for the other channels 313 and 314 may be set by the same method as described above. Here, the transmission sizes 333, 336, 339 and 342 for the respective channels 311, 312, 313 and 314 are set to values obtained by dividing the transmission size 324 of the register module 320. In the example of FIG. 6B, "033 8" (hexadecimal), the value of the transmission sizes 333, 336, 339 and 342 for the channels 311, 312, 313 and 314, is obtained by dividing "0×20", the value of the transmission size 324, by 4, the number of the channels 311, 312, 313 and 314. Accordingly, compared to the conventional time for setting channels four times, the channel setting time can be reduced, and data can be efficiently transmitted.

According to an exemplary embodiment of the present invention, a plurality of DMA channels are integratedly managed, and a multi-channel memory controller having various channels in contact with the DMA channels can have enhanced data transmission performance.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An integrated management method for a plurality of direct memory access (DMA) channels, comprising:
   storing a source address, a destination address, a transmission size, a source address offset and a destination address offset with respect to a data block to be transmitted;
   setting a divided source address and a divided destination address for each DMA channel by selectively adding or subtracting the source and destination address offsets to or from the source and destination addresses; and
   setting a divided transmission size for each DMA channel by dividing the transmission size by a number of the DMA channels,
   wherein the data block is transmitted through the plurality of DMA channels.

2. The method of claim 1, wherein the data block is transmitted to a device through a single memory channel.

3. The method of claim 1, wherein the steps of setting addresses and transmission sizes are performed in a single operation.

4. A method for managing a plurality of direct memory access (DMA) channels, comprising:
   storing a source address, a destination address, a transmission size, a source address offset, and a destination address offset, with respect to a data block to be transmitted;
   dividing the source address;
   dividing the destination address;
   dividing the transmission size for each DMA channel by dividing the transmission size by a number of DMA channels that are included in the plurality of DMA channels;
   setting a divided source address, divided destination address, and divided transmission size, for each of the plurality of DMA channels; and
   transmitting a first subset of the data block corresponding to a first divided source address, a first divided destination address, and a first divided transmission size through a first DMA channel of the plurality of DMA channels; and
   transmitting a second subset of the data block corresponding to a second divided source address, a second divided destination address, and a second divided transmission size through a second DMA channel of the plurality of DMA channels.

5. The method of claim 4, wherein the dividing the source address comprises selectively adding or subtracting source and destination address offsets to or from the source address.

6. The method of claim 4, wherein the steps of dividing the source address, dividing the destination address, and dividing the transmission size, are performed before the step of transmitting the first subset of the data block.

* * * * *